May 20, 1941.　　J. H. BUCKNAM ET AL　　2,242,448
TOOL SUPPORTING AND PROPELLING MACHINE
Filed Feb. 2, 1939　　4 Sheets-Sheet 1

INVENTORS
JAMES H. BUCKNAM
LLOYD W. YOUNG
FRANK C. GEIBIG
BY
ATTORNEY

May 20, 1941.   J. H. BUCKNAM ET AL   2,242,448
TOOL SUPPORTING AND PROPELLING MACHINE
Filed Feb. 2, 1939   4 Sheets-Sheet 2
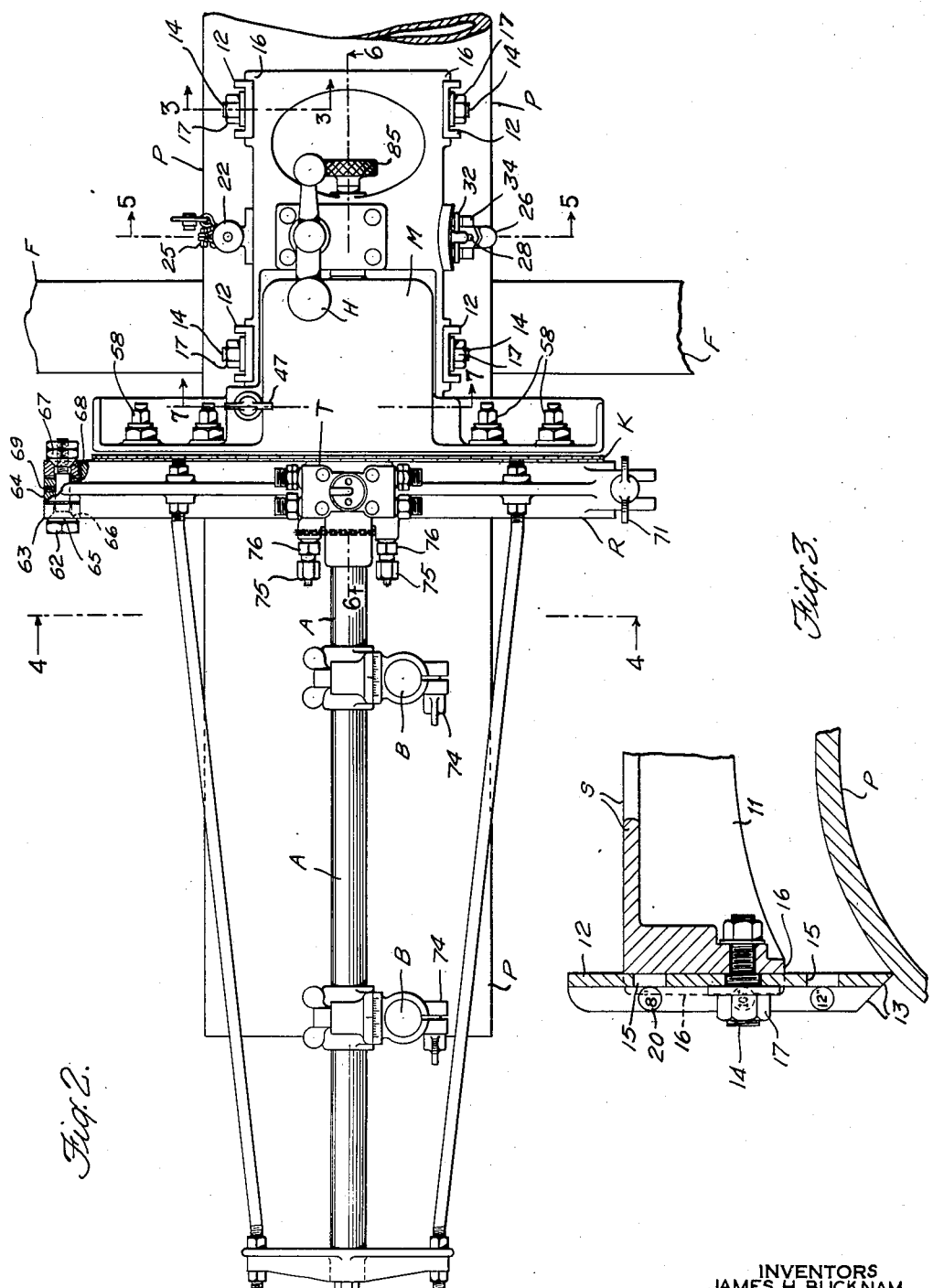
INVENTORS
JAMES H. BUCKNAM
LLOYD W. YOUNG
FRANK C. GEIBIG
BY
ATTORNEY May 20, 1941. J. H. BUCKNAM ET AL 2,242,448

TOOL SUPPORTING AND PROPELLING MACHINE

Filed Feb. 2, 1939 4 Sheets-Sheet 3

INVENTORS
JAMES H. BUCKNAM
LLOYD W. YOUNG
FRANK C. GEIBIG

BY
ATTORNEY

May 20, 1941.  J. H. BUCKNAM ET AL  2,242,448
TOOL SUPPORTING AND PROPELLING MACHINE
Filed Feb. 2, 1939  4 Sheets-Sheet 4
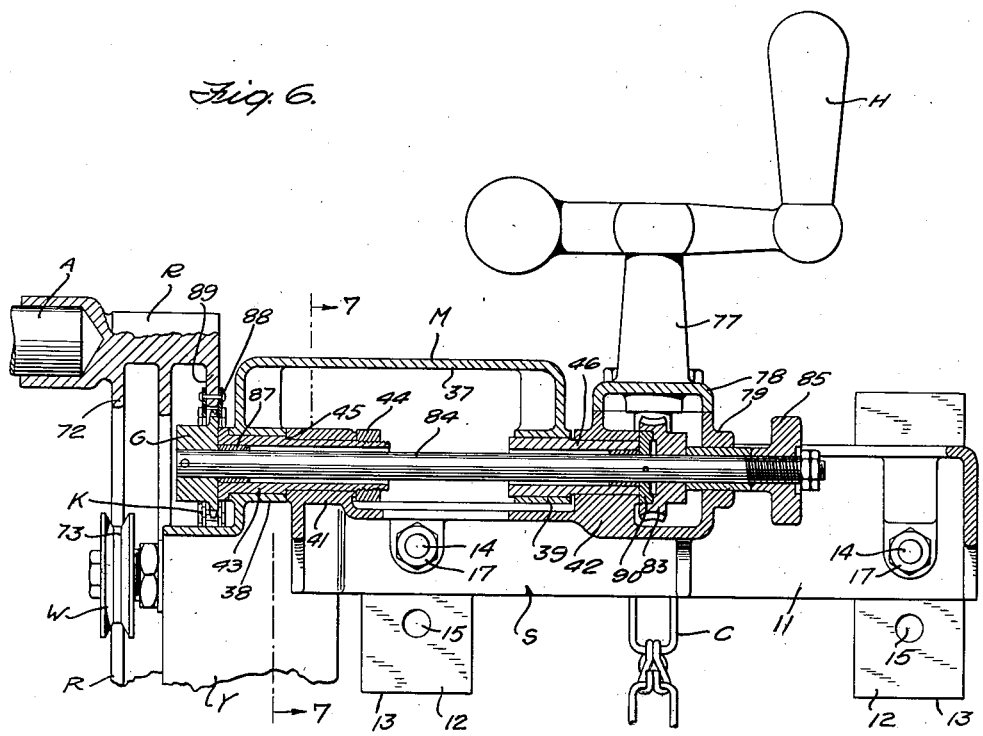
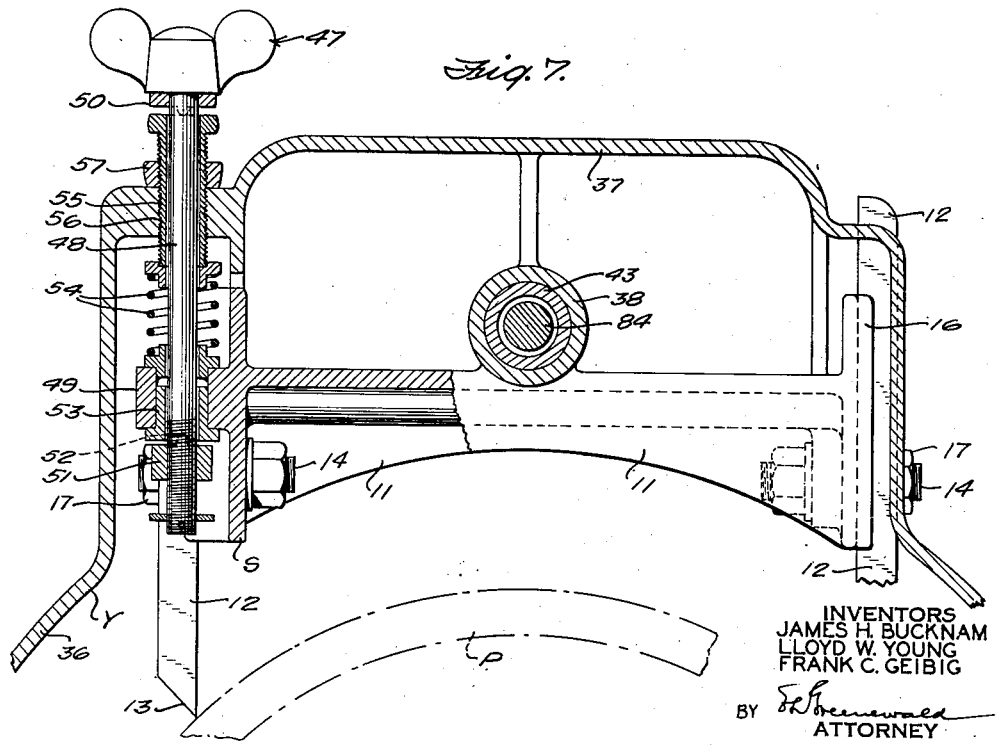
INVENTORS
JAMES H. BUCKNAM
LLOYD W. YOUNG
FRANK C. GEIBIG
BY
ATTORNEY Patented May 20, 1941

2,242,448

UNITED STATES PATENT OFFICE 2,242,448

TOOL SUPPORTING AND PROPELLING MACHINE

James H. Bucknam, Cranford, Lloyd W. Young, Scotch Plains, and Frank C. Geibig, Westfield, N. J., assignors to Oxweld Acetylene Company, a corporation of West Virginia Application February 2, 1939, Serial No. 254,182

16 Claims. (Cl. 266—23)

This invention relates to a tool supporting and propelling machine, and more particularly to a machine adapted to support and propel at least one blowpipe about the periphery of relatively large cylindrical and nearly cylindrical bodies, for instance, large pipes.

Blowpipe supporting machines of the type disclosed in U. S. Patents 1,775,667 to W. C. Bucknam, and in 1,886,855 and 2,028,425 to N. E. Wagner, find wide application in flame-cutting large diameter pipe, to effect a square severing cut transversely through the pipe, or to prepare bevelled surfaces on the pipe edge, as in preparation for a welding operation. Although the present invention is herein illustrated and described as embodied in a machine generally similar to those disclosed in the said patents and said machine is shown as equipped with a pair of flame-cutting blowpipes for operating about the periphery of large-diameter pipe, solid cylindrical billets, cylinder liners, or similar tubular members, the principles of the present invention may be incorporated in metal working and machine tools generally, and especially in machines equipped with one or more heating or welding blowpipes or similar thermal working instrumentalities for performing cutting, heat-treating, welding, brazing or related operations about a peripheral path or along any predetermined path.

The principal objects of the present invention are: to provide an improved machine for supporting and propelling a tool, such as a blowpipe, in a predetermined path, for example, about the periphery of a cylinder or pipe; to provide improved means for attaching and supporting such a machine upon a workpiece, for example, a cylinder or pipe to be operated upon; to provide improved means for accurately aligning at least one blowpipe with respect to the periphery of the pipe; to provide means for obtaining smooth and accurate motion of the blowpipe about the periphery of the pipe; and to provide simplified means for readily adapting the machine to fit any one of several sizes of pipe. These and other objects will become readily apparent from the following description and from the accompanying drawings showing a preferred embodiment of the invention and in which:

Fig. 2 is a plan view of the machine shown in Fig. 1, the blowpipe clamps being shown in the vertical position;

Fig. 3 is a detailed sectional view of the adjustable leg supporting means shown in Figs. 1 and 2, taken on the line 3—3 of Fig. 2;

Fig. 6 is a longitudinal detail sectional view taken on the line 6—6 of Fig. 2; and Fig. 7 is a vertical sectional detail view taken on the line 7—7 of Figs. 2 and 6.

Figure 1:
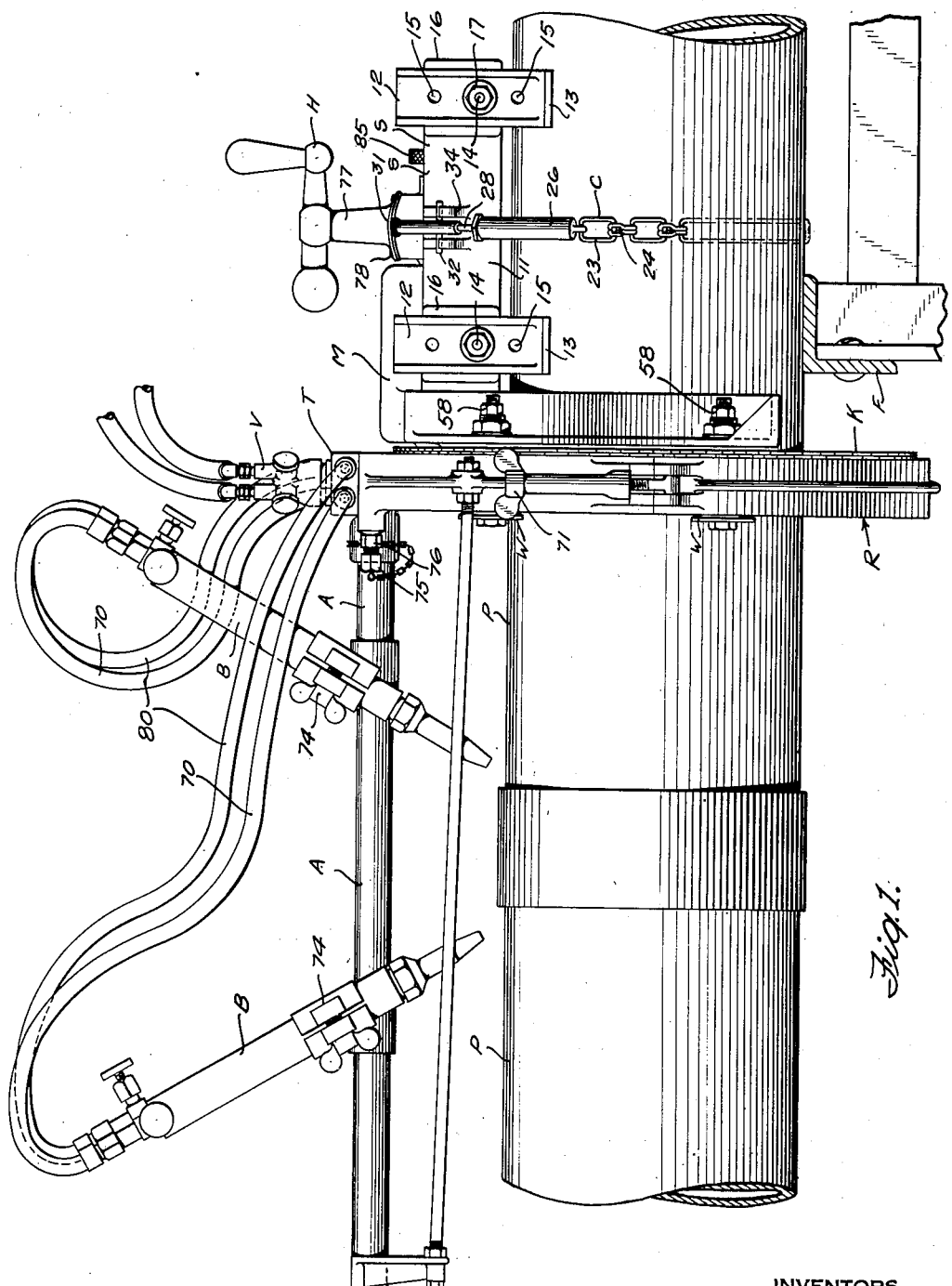
Fig. 1 is a side elevational view of one form of the improved machine, shown mounted in position upon a pipe at the start of a double bevel cutting operation.
Figure 4:
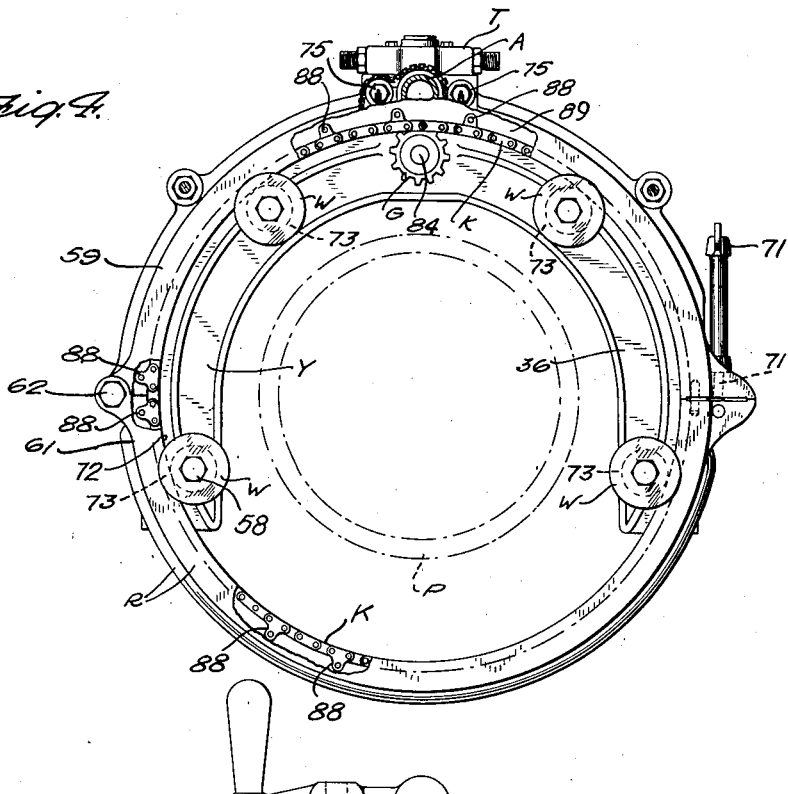
Fig. 4 is a sectional view taken on the line 4—4 of Fig. 2, with portions broken to show interior details.

Referring more particularly to Figs. 1 and 4, the blowpipe supporting and propelling machine M is adapted to be attached to a relatively large diameter pipe P supported in any suitable manner as by a frame F. The machine M is supported by means of a saddle or base S firmly held against the pipe P by an encircling chain C. A yoke Y adapted to partially surround the circumference of the pipe P is rigidly secured to the saddle S, by which the yoke is maintained in proper axial alignment with respect to the pipe. A split ring or annular guide R encircles the pipe and revolves about it by engagement with guide rollers or wheels W journalled to the yoke Y. An annular chain K, formed in two semi-circular halves, is secured to the guide R and engages the teeth of a sprocket G geared to a rotatable handle H. An arm A is supported by the ring R, extends longitudinally of the pipe P, and is adapted to support a blowpipe or blowpipes B, or a similar tool, adjustably in position for cutting. Rotation of the handle H turns the sprocket G which moves the chain K, the ring R, the arm A, and the blowpipe or blowpipes B, in a circumferential path about the periphery of the pipe P to perform the desired welding, bevelling, heat-treating, or similar operation.

Referring now in greater detail to the drawings, the machine M is provided with mounting means for securing the machine firmly upon the periphery of the cylinder or pipe P to be operated upon. Preferably, use is made of a saddle or support S comprising a housing 11 resting upon the outer curved surface of the pipe through a plurality of legs 12. The legs extend vertically downward on opposite sides of the housing 11, each leg terminating at its lower extremity in a blade 13, the relatively sharp edge of which engages the pipe periphery along a line parallel to its axis. A stud 14, secured to the vertical side portion of the housing 11 holds each leg in the desired position, as shown in Fig. 3. Each leg 12 is provided with means such as an elongated slot or a plurality of circular apertures 15 for selective engagement with the stud 14, whereby each or all legs 12 may be respectively raised or lowered to vary the height of the saddle S with respect to the pipe P, to thereby assist in aligning the blowpipe-supporting ring R by adjusting its vertical position in accordance with the size and shape of pipe or other article being treated. Suitable parallel guides 16 are provided on the housing 11 to prevent turning of the legs 12 upon the studs 14, and each leg when moved to the desired position may be firmly held in place as by a locking nut 17. Suitable designations 20 may be made along each leg, for example, adjacent to the respective apertures 15 as shown in Fig. 3, to indicate the proper location for each stud 14 for a corresponding size of pipe or other article being treated.

Figure 5:
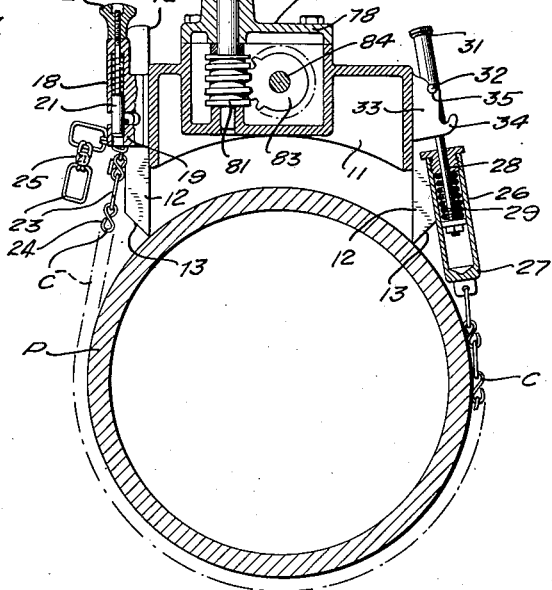
Fig. 5 is a vertical sectional view taken on the line 5—5 of Fig. 2.

The saddle may be maintained in fixed relation to the pipe P by means of a chain C which connects with opposite sides of the saddle and extends about the pipe. As shown in Fig. 5, the chain C is secured to one side of the saddle by hooking or locking means 18, preferably comprising a clevis 19 provided with a bolt or pin 21, normally in the locking position. The pin 21 may be disengaged by lifting a knob 22 so as to permit insertion, within the clevis, of a link 23 in the chain C. As indicated in Figs. 1 and 5, the chain C preferably comprises a series of flat large links 23 joined by intermediate smaller links 24. At one end of the chain C, alternate small links 24 are preferably provided with tabs 25 containing indicia designating the specific link 23 which must be inserted within the clevis 19 in order that the selected length of chain C may extend properly about the periphery for a given size of pipe.

The chain is held under suitable tension so as to apply an even pressure against the saddle, by means of a resilient element 26, a terminal latch, or similar tension-applying means, preferably connected into the chain as shown in Figs. 1 and 5. The resilient element 26 preferably comprises a tubular casing 27 secured to the extremity of the chain C. A spring-loaded plunger 28 telescopes within the casing 27, normally being urged into full telescoped position by means of a compression spring 29. A handle 31 provides means by which the plunger 28 may be manually retracted in opposition to the action of the spring 29. A pair of fingers 32 extend outwardly from opposite sides of the handle 31 for engagement with a latch or lock 33 secured to the vertical portion of the housing 11 on the side opposite the locking means 18. The latch 33 is provided with a plurality of recesses 34, 35 adapted to selectively engage the fingers 32 to hold the plunger in one of several retracted positions, the pressure applied to the chain C being varied according to the degree of compression of the spring 29.

A generally arcuate yoke Y is secured to one end of the saddle S so as to depend therefrom, the arms of the yoke partially encircling the pipe P. The yoke Y serves as a support for the blowpipe-supporting ring or other tool-carrier R and is employed to position the ring with respect to the pipe and to guide the ring during its rotary movement. The yoke Y comprises a flanged collar 36 adapted to extend, preferably slightly more than half way, about the periphery of the pipe P as shown in Fig. 4. The yoke is fitted at its top portion with a cover plate 37 forming the support for a pair of integral aligned bearings 38 and 39, as shown in Fig. 6. A pair of similarly shaped bearings 41 and 42 are formed in the top portion of the housing 11 to which the yoke is journalled. A tubular bolt 43 is passed through the bearings 38 and 41, the bearing 38 being held in close relationship to the bearing 41 by means of a nut 44 which is tightened until a flange 45 on the bolt 43 abuts against the bearing 41. A bushing 46 is suitably held within the bearing 42 to receive the bearing 39 of the yoke Y. The bearings 38 and 39 swivel upon the tubular bolt 43 and bushing 46, providing a pivotal connection between the yoke Y and the saddle S. Manufacturing tolerances may be closely maintained by regulation of the length and diameter of both the flange 45 and the bearing 38, leaving sufficient clearance between the parts to provide the desired amount of free motion. By this arrangement it is immaterial that a substantial space exists between the end of the bearing 39 and the bearing 42, as the free axial motion of the cover plate 37 is controlled by means of the tubular bolt 43, resulting in a relaxation of the tolerances which otherwise would have to be observed in mating the bearing 39 with the bearing 42.

The yoke Y is held against extreme degrees of pivotal motion about the axis of the bolt 43 by an adjuster 47, extending between the saddle or support S and the yoke Y, the purpose of which is to impart limited degrees of clockwise and counter-clockwise movement to the yoke relative to the fixed saddle S, thereby to align the yoke Y transversely with respect to the pipe P.

As shown in Fig. 7 the adjuster 47 comprises an alignment screw 48 extending substantially vertically through one side of the cover plate 37 and through a hollow boss 49 formed on the side of the saddle S. A rider or nut 51 is provided with tongues 52 projecting within corresponding grooves in a bushing 53 frictionally held within the hollow boss 49, which tongues inhibit rotation of the rider relative to the bushing 53 and boss 49. A compression spring 54 surrounds the screw 48 and exerts pressure from the boss 49 upwardly against the cover plate 37 tending to pivot the yoke in a clockwise direction about the bolt 43. The pressure of this spring is regulated by means of a threaded sleeve 55 engaging a threaded bore 56 in the cover plate 37, the sleeve being secured in adjusted position by a lock nut 57.

Accordingly, as the alignment screw 48 is threaded downwardly within the rider 51, pressure is applied against the flanged top of the threaded sleeve 55 through a washer 50 forcing the yoke Y to pivot about the axis of the bolt 43 in a counter-clockwise direction against the action of the spring 54. When the screw is turned in the opposite direction so as to retract the screw from the rider 51, the spring 54 correspondingly lifts the left side of the cover plate 37, as seen in Fig. 7, producing a clockwise motion of the yoke. Only a limited degree of movement is necessary in shifting the arms of the yoke sidewise to align the yoke properly with the pipe.

A blowpipe supporting ring R normally surrounds the yoke Y and is supported thereon by wheels W. The ring R is preferably formed of a top half section 59 and a bottom half section 61, split or divided diametrically as shown in Fig.

4. The two halves may be provided with a hinged joint 62, best seen in Fig. 2, comprising a clevis 63 formed, for example, on the lower half section, and an apertured portion 64 formed on the upper half section and held within the fork of the clevis 63 by means of a clevis pin or bolt 65. A conical seating surface 66 formed on the head of the bolt 65 engages a correspondingly shaped cavity in the adjoining outer face of the clevis 63. Similarly, a nut 67, threaded on the bolt 66, is provided with a conical seating surface or flange 68 smoothly engaging a correspondingly shaped cavity in the adjoining outer face of the clevis 63, the nut 67 being secured in position by a conventional lock nut. Although the portion 64 fits loosely within the fork of the clevis 63 to provide liberal manufacturing tolerances, a smooth joint, free of objectionable play between the upper and lower halves 59 and 61 is obtained by holding the apertured portion 64 firmly to the shank of the bolt 65 by any conventional locking means such as a set screw 69. The ring R may be secured in closed position by means of a locking bolt 71 connecting the two halves or segments of the ring at a point diametrally opposite the hinged joint 62.

The end face of the yoke Y is provided with a plurality of guide rollers or wheels W located about and in spaced relation to the periphery of the pipe P as shown in Fig. 4, the rollers at the ends of the yoke arms being located so as to bear against the lower portion of the ring R to thereby preclude lifting of the ring from the yoke when in operating position. The rollers W, which preferably are provided with enclosed anti-friction bearings, are secured to the end face of the yoke Y by means of bolts 58. The ring R may be provided with at least one annular rib or flange 72 to reenforce the ring and to provide an inner peripheral surface for engagement with the guide rollers W. Preferably, the rollers W are provided with a groove 73 to accommodate the narrow flange 72, thereby accurately guiding the ring in its rotary movement about the pipe, and securely holding the ring against removal. The ring R otherwise may be provided with an annular groove and the rollers W flanged for engagement with such a groove to provide a similar guide. The ring R when in the locked position rests directly upon the rollers W, and is completely removable from the support comprising the saddle S and yoke Y when the ring is opened. Accordingly, the setting up of the machine is simplified by first locating and securing the saddle in position, after which the ring and its associated blowpipes may be set on the yoke, thus conveniently distributing the weight of the machine for the operator. By making the ring R separable from the support, the surfaces of the rollers W and the sprocket G may be exposed to clean away deposits of oxide, and the like.

A suitable arm A is provided as shown, to accommodate one or more blowpipes or similar thermal working instrumentalities. The blowpipes may be adjustably supported upon the arm A by means of suitable clamps 74. In Fig. 1, a pair of cutting blowpipes are shown located in position with respect to a pipe P as to remove a coupling from the pipe and at the same time to form bevelled surfaces upon the cut edges of the pipe, for example, to prepare the edges for a subsequent welding operation. Oxygen and fuel gas are supplied to the respective blowpipes through hoses 70 and 80 connecting with a terminal block or manifold T secured to the ring R as shown in Fig. 1. The terminal block T is adapted to receive a detachable valve body and dual hose connection unit V, suitably of the type disclosed in W. C. Bucknam Patent 1,989,649, to which unit may be connected supply hoses leading to the respective sources of oxygen and fuel gas. A pair of caps 75, loosely chained to blank studs 76 on the ring R, may be used to block off one pair of the discharge connections from the terminal block T in the event that only one blowpipe is mounted upon the arm A.

Although the ring R may be rotated automatically as by a prime mover, the manually operable gearing illustrated in the drawings is suitable and satisfactory for most purposes. As shown in Figs. 5 and 6, a shaft 82 of an operating handle H is rotatably mounted within a pedestal 77 formed integrally with the cover plate 78 of a speed reduction gear housing 79 in the top of the saddle S. A worm 81, secured to the handle shaft 82 meshes with a worm wheel 83 freely journalled upon a sprocket shaft 84. The shaft 84 extends outside of the housing 79 and is threaded to receive a clutch knob 85. The worm wheel 83 may be locked with respect to the shaft 84 by tightening the clutch knob until the worm wheel 83 is pressed into frictional engagement with a clutch plate 90 keyed or pinned to the shaft 84. The sprocket shaft 84 is journalled within sleeves 87 held at the extreme opposite ends of the tubular bolt 43 and the bushing 46, respectively. A chain sprocket G is keyed or otherwise securely held to the end of the shaft 84 for engagement with the two continuous halves of the chain K. As shown in Figs. 4 and 6, alternate links 88 of the chain K are secured to an inwardly extending annular flange 89 on the ring R, as by means of rivets or the like. Accordingly, when the ring is locked the two halves of the chain K extend as a continuous loop completely about the inner periphery of the ring, forming in effect an internal ring gear rotatable by the sprocket G.

In preparation for the operation of the machine M, the pipe or cylinder to be operated upon is preferably clamped or otherwise mounted upon a suitable frame F. The four legs 12 of the saddle S are next adjusted in height by properly locating them upon the studs 14 so that the height of the saddle S is appropriate for the size of pipe, etc., to be treated. The locking bolt 71 is loosened and swung outwardly so that the lower half of the ring R may be dropped open to receive the pipe, after which the ring may be locked in closed position by bolt 71. The machine M is rested upon the upper surface of the pipe so that the legs 12 of the saddle S firmly engage the periphery of the pipe. Engagement of the blades 13 with the pipe surface resists displacement of the saddle S. As the legs 12 extend vertically downward and engage the pipe near the crest, adjustment of the position of the legs is effective for accurately aligning the yoke and blowpipe supporting ring R so far as the elevation is concerned. Optionally, the ring R initially may be removed completely from the saddle S and and the two parts separately mounted in position on the pipe P.

By lifting the knob 22, the desired link 23 of the chain C may be locked within the clevis 19, and the remaining length of chain passed about the pipe and placed under the desired tension by hooking the fingers of the handle 31 in the desired recess of the latch 33. The respective recesses 34 and 35 are preferably separated by a distance corresponding substantially to one-half of the distance on centers between the links 23 so that two distinct degrees of pressure may be applied selectively to the chain by means of the resilient element 26. The ring R and yoke Y are then adjusted laterally by operation of the adjuster 47 so as to bring them into proper axial relation with the pipe. With the clutch knob loosened, the blowpipes are located initially with respect to the pipe so as to place them in the proper position for the start of the operation, after which the clutch knob 85 may be tightened to lock the worm wheel 83 with the shaft 84. The blowpipes are then set in operation and the handle H is rotated manually at the desired speed. Rotation of the handle imparts rotary motion to the sprocket G which meshes with the chain K causing the entire ring R, arm A, and its blowpipe assembly to revolve about the pipe, the ring R being guided in its motion by the rollers W. As the ring R rotates, the blowpipes follow an annular path, the jets from the blowpipes being directed against successive portions about the periphery of the pipe as may be required to perform the various operations of welding, brazing, flame-softening, flame-hardening, flame-cutting, bevelling, or related operations. If desired, the blowpipes may be caused to follow their annular path by releasing the clutch knob 85 and by applying manual pressure directly against the ring R in which case the ring rotates freely and independently of the hand driven gearing.

Various modifications of the herein disclosed invention will readily suggest themselves to those skilled in the art without departing from the scope of the invention or sacrificing its advantages.

We claim:

1. A machine for propelling a tool, such as a blowpipe, in a predetermined path relatively to the surface of a workpiece to be operated upon, said machine comprising a base; a tool carrier mounted upon said base securable in fixed relation to said workpiece and movable relatively to said base and said workpiece; a tool supported by said carrier; and mechanism for propelling said carrier and the tool supported thereby relatively to said workpiece, such mechanism comprising a chain secured to and coextensive with said tool carrier said chain being located between said carrier and said workpiece; a sprocket rotatably mounted on said base and having teeth engaging said chain, and means carried by said base for rotating said sprocket.

2. A machine for supporting and propelling a tool about the periphery of a cylinder, comprising a saddle adapted to be mounted on said cylinder; a ring rotatably supported by said saddle and adapted to encircle said cylinder; means for securing a tool to said ring; and means for rotating said ring about said cylinder comprising a sprocket journalled to said saddle, means for rotating said sprocket, and a chain secured to the periphery of said ring for operative engagement with said sprocket, both said sprocket and said chain being located between said ring and said cylinder.

3. A machine for supporting and propelling a blowpipe about the periphery of a workpiece, comprising a saddle adapted to be mounted upon said workpiece; a rotatable ring carried by said saddle and adapted to encircle said workpiece; a blowpipe holder connected to and movable with said ring; a blowpipe carried by said holder; and mechanism for rotating said ring to move said blowpipe around said workpiece, such mechanism comprising a chain secured to said ring and coextensive with an inner periphery thereof, a sprocket rotatably mounted on said saddle and having teeth cooperating with said chain, and means carried by said saddle for rotating said sprocket.

4. In a machine for guiding a tool, such as a blowpipe, about the periphery of a cylinder or pipe, the combination comprising a saddle adapted to be mounted against the periphery of said pipe; a tool-supporting ring revolvably supported by said saddle and adapted to encircle said pipe in spaced relation thereto; said saddle comprising substantially vertically slidable legs having blades for engagement with the periphery of said pipe along lines parallel with the axis of said pipe; and means assisting in aligning said ring in coaxial relation to said pipe comprising fastening means for securing said slidable legs in one of several definite predetermined positions with respect to said saddle to thereby correlate the elevation of said saddle and said ring with respect to said pipe according to the external diameter of said pipe.

5. A machine for supporting a tool, such as a blowpipe, for movement about the periphery of a horizontal cylinder or pipe, comprising a saddle adapted to be secured in fixed relation to said pipe; a substantially annular tool-supporting member movably mounted with respect to said saddle; means for positioning said saddle in adjustable spaced relation to said pipe to vertically adjust the position of said saddle and said member with respect to said pipe; and means for substantially horizontally adjusting said member transversely with respect to said pipe and said saddle.

6. In a machine for supporting a blowpipe for movement about the periphery of a cylinder or pipe, the combination comprising a generally annular blowpipe-supporting member; mounting means adapted to be secured to the periphery of said pipe; and means for aligning said blowpipe-supporting member with respect to said pipe, comprising a pivotal connection between said mounting means and said blowpipe-supporting member.

7. A machine for supporting a blowpipe for movement about the periphery of a cylinder or pipe, comprising mounting means for securing said machine in operative relation to said pipe; a plurality of grooved guide rollers journalled with respect to said mounting means at points spaced from and about the periphery of said pipe; and a generally annular blowpipe-supporting member having an inwardly extending flange engaging the grooved portion of said rollers.

8. A machine for supporting a blowpipe for movement about the periphery of a cylinder or pipe, comprising means for mounting said machine in operative relation to said pipe; a yoke secured to said means and having depending arms adapted to partially encircle said pipe; rollers and a driving sprocket journalled to said yoke; and a blowpipe-supporting ring, adapted to encircle said pipe and to operatively engage said rollers and said sprocket along inner peripheral portions of said ring, whereby said rollers guide said ring during its rotary movement about said pipe.

9. A machine as claimed in claim 8 wherein at least one of said rollers on each of said arms engages the inner periphery of said ring at a point below the center of said ring, and wherein said ring is composed of hinged segments.

10. A machine for propelling a tool such as a blowpipe about the periphery of a cylinder or pipe, comprising mounting means for securing and supporting said machine in operative relation upon said pipe; a shaft journalled with respect to said means; means for rotating said shaft; a yoke depending from said shaft and adapted to partially encircle said pipe; means for aligning said yoke with respect to said pipe comprising means for pivoting said yoke about the axis of said shaft; a tool-holding member supported by said yoke for rotary motion about said pipe; and means secured to said shaft for imparting rotary motion to said tool-holding member.

11. A machine for propelling a tool as claimed in claim 10, wherein said means for aligning said yoke comprises an adjuster extending between said mounting means and said yoke, said adjuster being adapted to impart clockwise and counter-clockwise motion to said yoke about said shaft with respect to said mounting means.

12. A machine for propelling a tool as claimed in claim 10, wherein said yoke is held to said mounting means by means of a tubular bolt surrounding said shaft and extending between said yoke and said mounting means, said yoke being journalled to said bolt.

13. A machine for propelling a tool as claimed in claim 10, including a clutch for releasing said shaft from said rotating means, whereby said tool-holding member may rotate freely and independently of said rotating means.

14. In a machine for supporting and propelling a blowpipe about the periphery of a cylinder or pipe, the combination comprising a saddle; a chain connected to one side of said saddle and adapted to extend about said pipe to mount said saddle to said pipe; tabs secured to certain links of said chain designating which of said links are to be connected to the opposite side of said saddle, in order that the selected portion of said chain properly may extend about the periphery of pipes of respectively different diameter from opposite sides of said saddle; and means for applying a predetermined tension to said selected portion of said chain for firmy holding said saddle to said pipe.

15. A machine for supporting a blowpipe for rotational movement about the periphery of a cylinder or pipe, comprising mounting means for securing said machine in operative relation to said pipe; a plurality of grooved guide rollers journalled with respect to said mounting means at points spaced from and about the periphery of said pipe; a generally annular blowpipe-supporting member having an annular peripheral flange adapted to engage said grooved rollers to provide an annular guide for said member; and rotating means comprising an internal gear on said member, and a rotatable sprocket operatively engaging said gear at a point between said gear and said pipe.

16. A machine for supporting a blowpipe for movement about the periphery of a cylinder or pipe, comprising mounting means for securing said machine in operative relation to said pipe; a generally annular blowpipe-supporting member; means for supporting said member for rotation substantially about the axis of said pipe; a shaft pivotally securing said supporting means to said mounting means; and means operative to shift said supporting means and said member about the axis of said shaft for regulating the position of said member substantially transversely of said pipe.

JAMES H. BUCKNAM.
LLOYD W. YOUNG.
FRANK C. GEIBIG.

CERTIFICATE OF CORRECTION.

Patent No. 2,242,448.   May 20, 1941.

JAMES H. BUCKNAM, ET AL.

It is hereby certified that error appears in the printed specification of the above numbered patent requiring correction as follows: Page 4, first column, lines 45 and 46, claim 1, strike out the words "securable in fixed relation to said workpiece" and insert the same after the word "base" and before the semicolon in line 44, same claim; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.